United States Patent
Hou et al.

(10) Patent No.: US 11,775,884 B2
(45) Date of Patent: *Oct. 3, 2023

(54) ELIGIBILITY PREDICTIONS FOR INSTANT BOOKING IN AN ONLINE MARKETPLACE

(71) Applicant: Airbnb, Inc., San Francisco, CA (US)

(72) Inventors: Yi Hou, Foster City, CA (US); Li Fan, Belmont, CA (US); Trunal Bhanse, Sunnyvale, CA (US); Andrew Chen, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,166

(22) Filed: Oct. 25, 2022

(65) Prior Publication Data

US 2023/0052819 A1 Feb. 16, 2023

Related U.S. Application Data

(63) Continuation of application No. 16/169,172, filed on Oct. 24, 2018, now Pat. No. 11,521,135.

(51) Int. Cl.
*G06Q 10/02* (2012.01)
*G06Q 30/02* (2023.01)
(Continued)

(52) U.S. Cl.
CPC .............. *G06Q 10/02* (2013.01); *G06N 20/00* (2019.01); *G06Q 30/0205* (2013.01); *G06Q 30/0627* (2013.01); *H04W 4/025* (2013.01)

(58) Field of Classification Search
CPC . G06Q 10/02; G06Q 30/0205; G06Q 30/0627
See application file for complete search history.

(56) References Cited

U.S. PATENT DOCUMENTS

2003/0028451 A1 2/2003 Ananian
2004/0210479 A1 10/2004 Perkowski et al.
(Continued)

FOREIGN PATENT DOCUMENTS

WO WO-2020086652 A1 4/2020

OTHER PUBLICATIONS

Anthony, First Time Using Airbnb? Important Things You Need to Know, Jan. 27, 2016, The Travel Mentor, https://www.thetravelmentor.com/2016/01/first-time-using-airbnb-important-things-you-need-to-know/ (Year: 2016).*

(Continued)

*Primary Examiner* — Resha Desai
*Assistant Examiner* — Ismail A Manejwala
(74) *Attorney, Agent, or Firm* — Schwegman Lundberg & Woessner, P.A.

(57) ABSTRACT

Systems and methods are provided for receiving a request for services in a given location from a client device operated by a user and generating a set of features based on information included in the request for services in the given location. The systems and methods further provide for analyzing the set of features using a machine learning model to predict whether only services that can be instantly booked should be provided in response to the request for services in the given location, analyzing a prediction output by the machine learning model to determine that only services that can be instantly booked should be provided in response to the request for services in the given location, and generating a list with only services that can be instantly booked.

20 Claims, 8 Drawing Sheets

(51) Int. Cl.
*H04W 4/02* (2018.01)
*G06N 20/00* (2019.01)
*G06Q 30/06* (2023.01)
*G06Q 30/0204* (2023.01)
*G06Q 30/0601* (2023.01)

(56) References Cited

U.S. PATENT DOCUMENTS

| | | | |
|---|---|---|---|
| 2009/0265257 | A1 | 10/2009 | Klinger et al. |
| 2012/0290433 | A1 | 11/2012 | England et al. |
| 2015/0204684 | A1* | 7/2015 | Rostamian ............ G06Q 10/101 701/537 |
| 2018/0349808 | A1* | 12/2018 | Sahadi ................. G06Q 10/047 |
| 2020/0134513 | A1 | 4/2020 | Hou et al. |

OTHER PUBLICATIONS

Hou, The Smart Instant Book Filter, Dec. 19, 2017, Medium the Airbnb Tech Blog https://medium.com/airbnb-engineering/smart-instant-book-filter-book-with-confidence-ab3d6dace0b2 (Year: 2017).*

"U.S. Appl. No. 16/169,172, Non Final Office Action dated Mar. 10, 2022", 28 pgs.

"U.S. Appl. No. 16/169,172, Notice of Allowance dated Sep. 7, 2022", 12 pgs.

"U.S. Appl. No. 16/169,172, Response filed May 11, 2022 to Non Final Office Action dated Mar. 10, 2022", 14 pgs.

"International Application Serial No. PCT/US2019/057552, International Preliminary Report on Patentability dated May 6, 2021", 7 pgs.

"International Application Serial No. PCT/US2019/057552, International Search Report dated Jan. 30, 2020", 2 pgs.

"International Application Serial No. PCT/US2019/057552, Written Opinion dated Jan. 30, 2020", 5 pgs.

Anthony, "First Time Using Airbnb? Important Things You Need to Know", The Travel Mentor, [Online] Retrieved from the internet: <https://www.thetravelmentor.com/2016/01/first-time-using-airbnb-important-things-you-need-to-know/>, (Jan. 27, 2016).

Hou, "The Smart Instant Book Filter", Medium the Airbnb Tech Blog, [Online] Retrieved from the internet: <https://medium.com/airbnb-engineering/smart-instant-book-filter-book-with-confidence-ab3d6dace0b2>, (Dec. 19, 2017).

* cited by examiner

US 11,775,884 B2

ELIGIBILITY PREDICTIONS FOR INSTANT BOOKING IN AN ONLINE MARKETPLACE

PRIORITY

This application is a continuation of U.S. patent application Ser. No. 16/169,172, filed Oct. 24, 2018, which is incorporated by reference herein in its entirety.

BACKGROUND

An online marketplace may provide a number of services (e.g., accommodations, tours, transportation) and allow users to reserve or "book" one or more service. Some online marketplaces have the option to either book a service instantly or contact a host of the service to inquire about booking the service. The ability to instantly book a service may be a better experience for a user, however, in some instances and markets, it may be better to also be able to access services that do not have an instant-book option.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
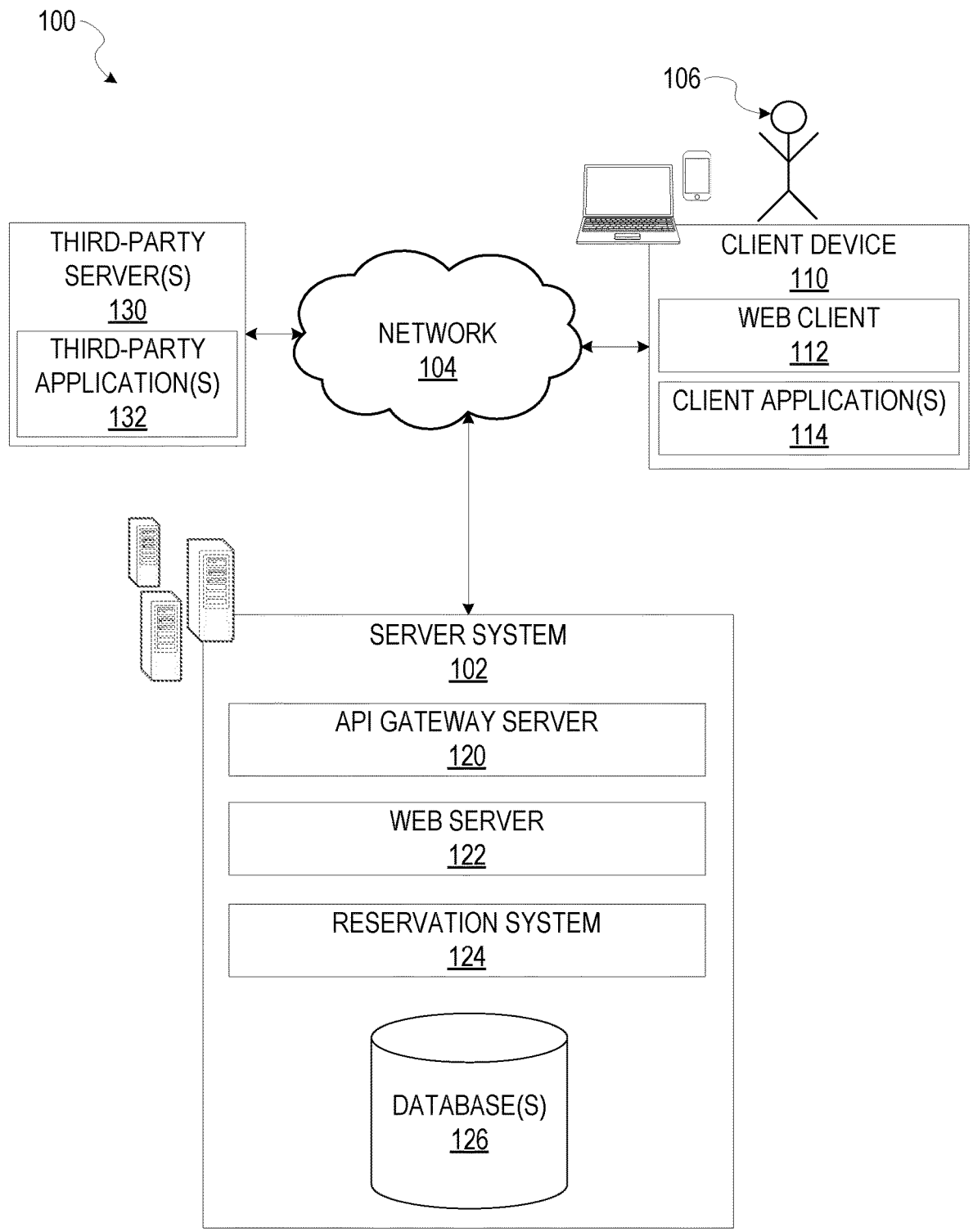
FIG. 1 is a block diagram illustrating a networked system, according to some example embodiments.

Systems and methods described herein relate to optimizing an instant book option for an online marketplace. For example, the online marketplace may provide various listings for services, such as trip items. For instance, services or trip items may comprise accommodations hosted by various managers which can be reserved by clients, such as an apartment, a house, a cabin, a camper, one or more rooms in an apartment or house, and the like. For example, one manager or owner of a home may list one or more rooms in his own home on the online marketplace, a second manager of a home may list an entire home on the online marketplace, a third manager may list an entire cabin on the online marketplace, and so forth. In one example, the listings may be time-expiring inventory. With time-expiring inventory (e.g., time-expiring accommodations), if the inventory is not booked and used before it expires, the inventory is wasted, and the manager receives no revenue. The online marketplace may further provide listings for other services or trip items, such as experiences (e.g., local tours), car rental, flights, public transportation, and other transportation or activities related to travel. "Supplier," "manager," "host," and "owner" are used interchangeably herein to mean a user or entity that hosts a particular service (e.g., accommodation, tour, transportation option, etc.).

The online marketplace may allow for managers of trip items to enable functionality for instant booking for one or more of their listings for services. Instant book listings do not require approval from the host before a user can book the service or trip item. Instead, the user can just choose the date(s) for the service and confirm the reservation via instant booking in real time (or near real time). For example, once the user sends information to reserve a service (e.g., name, date(s), etc.), the user will receive (in real time or near real time) confirmation that the service is reserved for the user. Listings that do not have instant booking enabled, however, require approval from the host of the listing before a user can reserve the service or trip item. For example, a user would need to explicitly send a request to a host of a listing to ask to reserve the service and wait for a response. The response may include a request for more information, deny the request for the service, or confirm booking of the service. Accordingly, the online marketplace comprises a mixed supply of listings with some listings that are instantly bookable and other listings that are not instantly bookable. In one example, listings that have instant booking enabled may receive additional benefits, such as, a higher placement in a search result for services and the ability to receive a recognized status as a reliable host.

In some cases, it may make sense to display only a list of services to a user that are instantly bookable, and not display (e.g., hide) other available services that are not instantly bookable. For example, in a market (e.g., location or destination) where there are a lot of listings or where a user is in a rush to book a service, it may provide a better user experience to list only services that are instantly bookable. In this case the chance of a reservation may increase if a user can instantly book the service. In other cases, it may make sense to list both instantly bookable services and services that are not instantly bookable. For example, in a market with only a few listings, if only instantly bookable listings were displayed, other high-quality listings in the market would not be displayed. This may cause a user to look for other options outside of the online marketplace and cause hosts in the area to lose interest (and revenue) in the online marketplace.

One technical challenge in determining whether to display only instantly bookable listings or to display both instantly bookable listings and non-instantly bookable listings is that there are a number of factors that can be considered to determine the best results for a user, a host, and the system of the online marketplace. The complexity of so many factors becomes far beyond human capability to calculate. For example, it is not possible to determine the dependency of each factor or feature on each of the other factors of features. In order to overcome this technical limitation, example embodiments use machine learning methodology to analyze features related to the user(s) interested in booking a listing, features related to one or more hosts or listings, and features related to the market dynamics of the listings.

For example, example embodiments extract user data, host data, and market dynamics from the online marketplace and use this data to train a machine learning model to determine whether or not only instantly bookable listings should be provided for a given location of interest. Then when the system receives a request for services in a given location from a client device operated by a user, it generates a set of features based on information included in the request for services in the given location, profile data associated with the user interaction with the online marketplace, supplier information for services associated with the given location, and market dynamics information associated with the given location. The system analyzes the set of features using the trained machine learning model and a prediction output by the machine learning model to determine whether only services that can be instantly booked should be provided in response to the request for services in the given location. The system can then generate a list of services based on the prediction output by the machine learning model and provide the list of services to the requesting device.

FIG. 1 is a block diagram illustrating a networked system 100, according to some example embodiments. The system 100 may include one or more client devices such as a client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth. The client device 110 may be a device of a user that is used to request and receive reservation information, accommodation information, and so forth, associated with individual or group travel.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., voice input, touch screen input, alphanumeric input, etc.) to the client device 110 and the input may be communicated to other entities in the system 100 (e.g., third-party servers 130, a server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client 112 (e.g., a browser, such as the Internet Explorer® browser developed by Microsoft® Corporation of Redmond, Wash.) or one or more client applications 114. The client device 110 may include one or more client applications 114 (also referred to as "apps") such as, but not limited to, a web browser, a messaging application, an electronic mail (email) application, an e-commerce site application, a mapping or location application, a reservation application, and the like.

In some embodiments, one or more client applications 114 may be included in a given one of the client devices 110 and configured to locally provide the user interface and at least some of the functionalities, with the client application 114 configured to communicate with other entities in the system 100 (e.g., third-party servers 130, the server system 102, etc.), on an as-needed basis, for data and/or processing capabilities not locally available (e.g., to access reservation information or listing information, to request data, to authenticate a user 106, to verify a method of payment, etc.). Conversely, one or more client applications 114 may not be included in the client device 110, and then the client device 110 may use its web browser to access the one or more applications hosted on other entities in the system 100 (e.g., third-party servers 130, the server system 102, etc.).

The system 100 may further include one or more third-party servers 130. The one or more third-party servers 130 may include one or more third-party application(s) 132. The one or more third-party application(s) 132, executing on the third-party server(s) 130, may interact with the server system 102 via a programmatic interface provided by an application programming interface (API) gateway server 120. For example, one or more of the third-party applications 132 may request and utilize information from the server system 102 via the API gateway server 120 to support one or more features or functions on a website hosted by a third party or an application hosted by the third party. The third-party website or application 132, for example, may provide various functionality that is supported by relevant functionality and data in the server system 102.

The server system 102 may provide server-side functionality via the network 104 (e.g., the Internet or a wide area network (WAN)) to one or more third-party servers 130 and/or one or more client devices 110. The server system 102 may be a cloud computing environment, according to some example embodiments. The server system 102, and any servers associated with the server system 102, may be associated with a cloud-based application, in one example embodiment.

In one example, the server system 102 provides server-side functionality for an online marketplace. As explained above, the online marketplace may provide various listings for trip items, such as accommodations hosted by various managers (also referred to as "owners" or "hosts") which can be reserved by clients (also referred to as "users" or "guests"), such as an apartment, a house, a cabin, one or more rooms in an apartment or house, and the like. For example, one manager or owner of a home may list one or more rooms in his own home on the online marketplace, a second manager of a home may list an entire home on the online marketplace, a third manager may list an entire cabin on the online marketplace, and so forth. In one example, the listings may be time-expiring inventory. With time-expiring inventory (e.g., time-expiring accommodations), if the inventory is not booked and used before it expires, the inventory is wasted, and the manager receives no revenue. The online marketplace may further provide listings for other trip items, such as experiences (e.g., local tours), car rental, flights, public transportation, and other transportation or activities related to travel.

The server system 102 may include the API gateway server 120, a web server 122, and a reservation system 124, that may be communicatively coupled with one or more databases 126 or other forms of data store.

The one or more databases 126 may be one or more storage devices that store data related to the reservation system 124 and other systems or data. The one or more databases 126 may further store information related to third-party servers 130, third-party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage, in some embodiments.

The reservation system 124 may manage resources and provide back-end support for third-party servers 130, third-party applications 132, client applications 114, and so forth, which may include cloud-based applications. The reservation system 124 may provide functionality for viewing listings related to trip items (e.g., accommodation listings, activity listings, etc.), managing listings, booking listings and other reservation functionality, and so forth, for an online marketplace. Further details related to the reservation system 124 are shown in FIG. 2.

Figure 2:
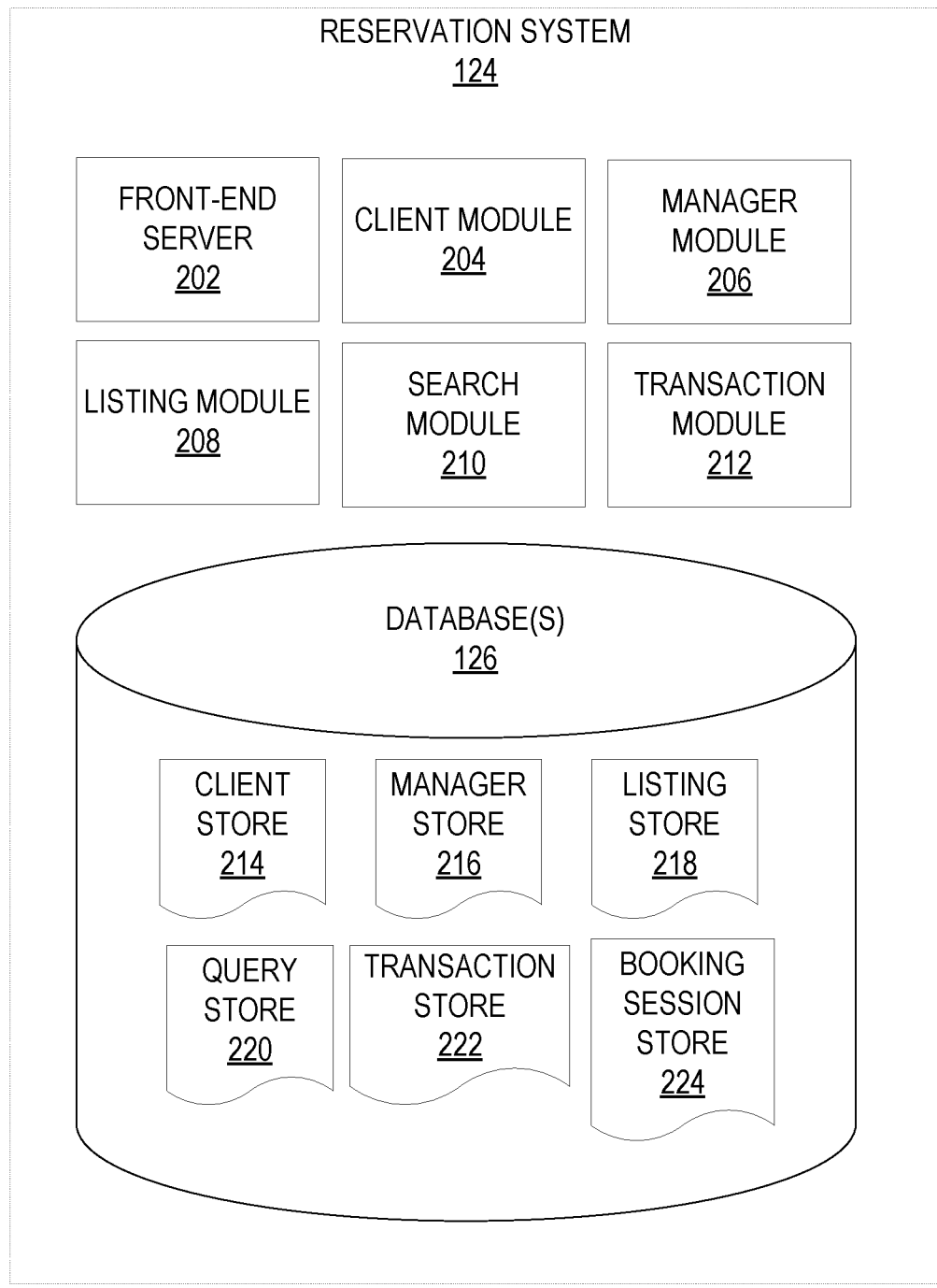
FIG. 2 is a block diagram illustrating a reservation system, according to some example embodiments.

FIG. 2 is a block diagram illustrating a reservation system 124, according to some example embodiments. The reservation system 124 comprises a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein.

The reservation system 124 may be implemented using a single computing device or a network of computing devices, including cloud-based computer implementations. The computing devices may be server-class computers including one or more high-performance computer processors and random access memory, which may run an operating system such as Linux or the like. The operations of the reservation system 124 may be controlled either through hardware or through computer programs installed in non-transitory computer-readable storage devices such as solid-state devices or magnetic storage devices and executed by the processors to perform the functions described herein.

The front-end server 202 includes program code that allows client and manager client devices 110 to communicate with the reservation system 124. The front-end server 202 may utilize the API gateway server 120 and/or the web server 122 shown in FIG. 1. The front-end server 202 may include a web server hosting one or more websites accessible via a hypertext transfer protocol (HTTP), such that user agents, such as a web browser software application, may be installed on the client devices 110 and can send commands to and receive data from the reservation system 124. The front-end server 202 may also utilize the API gateway server 120 that allows software applications installed on client devices 110 to call to the API to send commands to and receive data from the reservation system 124. The front-end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client ID and client profile, both of which are stored in the client store 214.

The client profile includes a number of client-related attribute fields that may include a profile picture and/or other identifying information, a geographical location, a client calendar, and so forth. The client's geographical location is either the client's current location (e.g., based on information provided by the client device 110), or the client's manually entered home address, neighborhood, city, state, or country of residence. The client location may be used to filter search criteria for time-expiring inventory relevant to a particular client or to assign default language preferences. The client attributes or features are further described below.

The client module 204 provides code for clients to set up and modify the client profile. The reservation system 124 allows each client to communicate with multiple managers. The reservation system 124 allows a client to exchange communications, request transactions, and perform transactions with managers.

The manager module 206 comprises program code that provides a user interface that allows managers (also referred to herein as "hosts" or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216.

The manager profile is associated with one or more listings owned or managed by the manager and includes a number of manager attributes including transaction requests and a set of listing calendars for each of the listings managed by the manager. The manager attributes or features are further described below.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list trip items, such as time-expiring inventory, for booking by clients. The listing module 208 is configured to receive the listing from a manager describing the inventory being offered; a timeframe of its availability including one or more of the start date, end date, start time, and an end time; a price; a geographical location; images and description that characterize the inventory; and any other relevant information. For example, for an accommodation reservation system, a listing may include a type of accommodation (e.g., house, apartment, room, sleeping space, or other), a representation of its size (e.g., square footage, or number of rooms), the dates that the accommodation is available, and a price (e.g., per night, per week, per month, etc.). The listing module 208 allows a user 106 to include additional information about the inventory, such as videos, photographs, and other media.

The geographical location associated with the listing identifies the complete address, neighborhood, city, and/or country of the offered listing. The listing module 208 is also capable of converting one type of location information (e.g., mailing address) into another type of location information (e.g., country, state, city, and neighborhood) using externally available geographical map information.

The price of the listing is the amount of money a client needs to pay in order to complete a transaction for the inventory. The price may be specified as an amount of money per day, per week, per day, per month, and/or per season, or per another interval of time specified by the manager. Additionally, the price may include additional charges such as cleaning fees, pet fees, service fees, and taxes, or the listing price may be listed separately from additional charges. The listing attributes or features are further described below.

Each listing is represented in the reservation system 124 by a listing object, which includes the listing information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a time period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory, etc.). Information from each listing calendar is stored in the listing store 218.

The search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively, which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book a listing, whereby the online marketplace books or reserves the listing upon receipt of the filled-out form from the client.

The transaction store 222 stores request made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as described below.

The transaction module 212 may also provide managers and clients with the ability to exchange informal requests to transact. Informal requests are not sufficient to be binding upon the client or manager if accepted, and in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Figure 3:
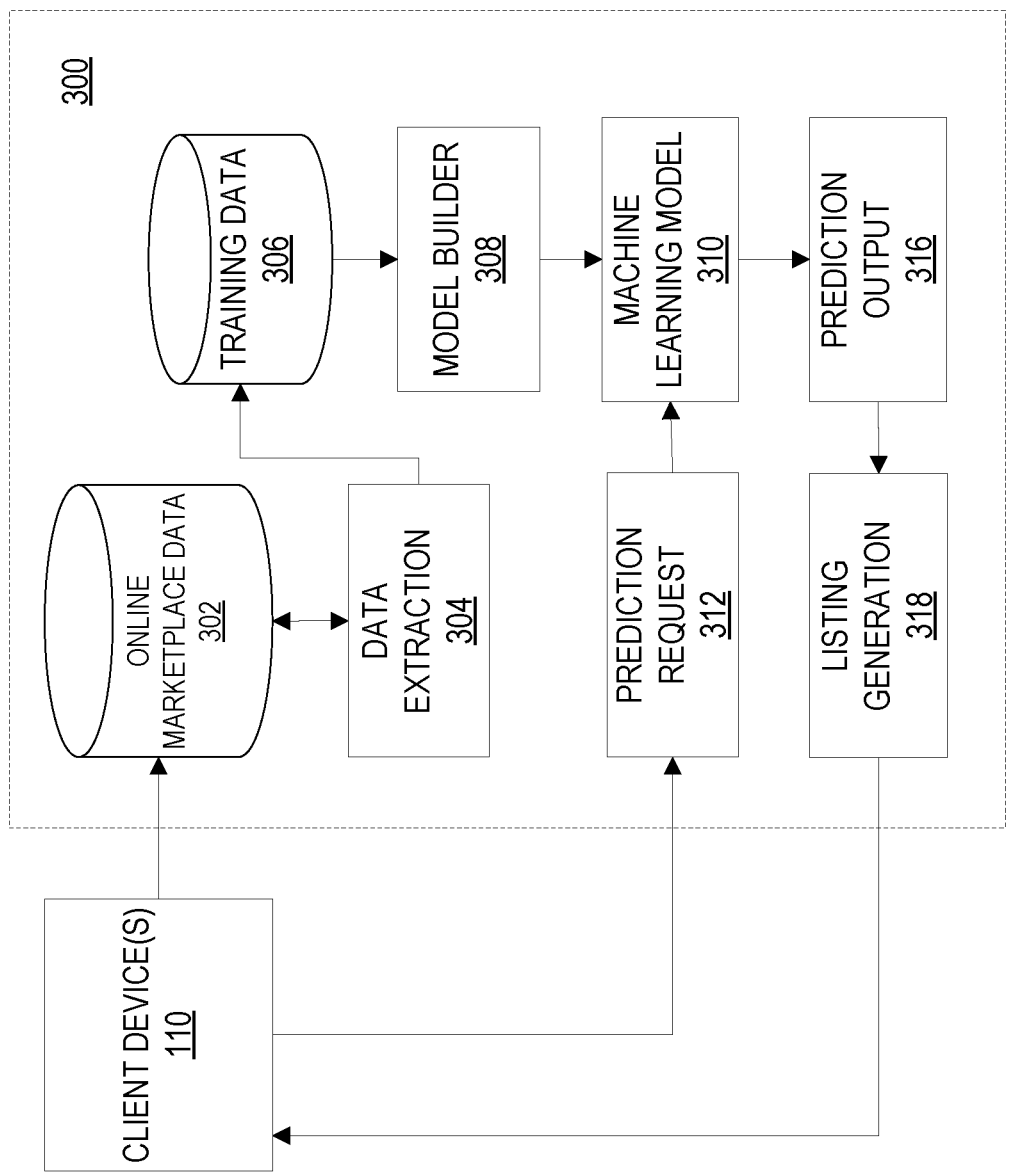
FIG. 3 is a block diagram illustrating a machine learning modeling system, according to some example embodiments.

FIG. 3 is a block diagram illustrating a machine learning modeling system 300 that may be part of the reservation system 124 or server system 102. Client devices 110 interact with the reservation system 124 or server system 102 thereby generating data related to the interactions with the system. For example, a client device 110 may be used to search for services in an online marketplace, view a list of services available in a given location, view individual listings for services, book one or more services, send and receive messages to and from hosts or managers of a service, generate a review for a listing or host, and so forth. Moreover, a client device 110 may be used to list a service, manage a service, send and receive messages to and from guests interested in the service, generate a review for a user (e.g., guest), and so forth. These interactions and data associated with the interactions are stored in one or more databases. In FIG. 3 this is shown as online marketplace data 302. In other examples, this data may be stored in multiple databases, or in databases internal to the machine learning modeling system 300, external to the machine learning modeling system 300, or a combination of both.

The online marketplace data 302 may further comprise data about markets or locations of services. For example, the online marketplace data 302 may comprise location data for a market (e.g., neighborhood, city, state, country), number of services or listings available in a market, how many instant-book listings are available in the market, how many non-instant-book listings are available in the market, popularity of the market, proximity of nearby markets, and so forth. The market or location data may also be in one or more data stores and stored internally to the machine learning modeling system 300 and/or externally to the machine learning modeling system 300. The data stored in the online marketplace data 302 may be used for training a machine learning model 310.

This online marketplace data 302 may thus be received from client devices 110, from other datastores within the server system 102 or reservation system 124, and/or from third-party sources such as the third-party server 130. A data extraction component 304 extracts data from the online marketplace data 302 and stores the data as training data 306. For example, the data extraction component 304 may extract data related to users of the system, data related to hosts of the system, and data related to markets associated with the system.

In one example embodiment, model training data is collected by turning on instant booking for a small percentage of users of an online marketplace (e.g., the server system 102 or reservation system 124). During collection of the model training data, each search for a service where the service is actually booked (e.g., confirmed as a reservation) is logged and stored in the online marketplace data 302. This data is then extracted by the data extraction component 304 and stored as training data 306. The following table illustrates an example of data captured for a plurality of features and whether or not the listing was booked (e.g., 1) or not booked (e.g., 0):

| Feature 1 | Feature 2 | ... | Feature 61 | Feature 62 | Booked? |
|---|---|---|---|---|---|
| XXX | XXX | ... | XXX | XXX | 1 |
| XXX | XXX | ... | XXX | XXX | 0 |

Some examples of features that may be used in example embodiments are described in further detail below.

A model builder 308 uses the training data 306 to train a machine learning model 310 to predict whether only instant-book listings should be provided for a given market or location. Some example machine learning models that may be used in example embodiments include a Random Forests algorithm, Decision Tree algorithm, Logistic Regression algorithm, and XGBoost algorithm. It is to be understood that other machine learning models may be used in other example embodiments. In one example embodiment, the XGBoost algorithm is used for best performance. The machine learning model 310 is tested for accuracy until a final machine learning model 310 is trained and ready to use for predictions.

A prediction request component 312 receives a request for a prediction (e.g., during a search for listings in a particular market or location) from the client device(s) 110. In one example, the request is for listings of services for a given market or location. For example, a request may be for rooms available in San Francisco for a particular date range. The prediction request component 312 generates features (e.g., user features, supplier features, market features) based on the request and inputs the features into the machine learning model 310.

The machine learning model 310 analyzes the features to generate a prediction output 316. In one example, the prediction is a numerical value (e.g., 0 or 1) to indicate that only instant-book listings should be provided to the requesting client device (e.g., 1) or that both instant-book listings and non-instant-book listings should be provided to the requesting client device (e.g., 0). A listing generation component 318 analyzes the prediction output 316 and generates a list of services to be provided to the requesting client device 110, based on the prediction output 316. The list of services is provided to the requesting client device 110.

Any one or more of the modules or components described herein may be implemented using one or more processors (e.g., by configuring such one or more processors to perform functions described for that module) and hence may include one or more of the processors. Any one or more of the modules described may be implemented using hardware alone (e.g., one or more of the processors of a machine) or a combination of hardware and software. For example, any module described of the machine learning modeling system 300 may physically include an arrangement of one or more of the processors (e.g., a subset of or among the one or more processors of the machine) configured to perform the operations described herein for that module. As another example, any module of the machine learning modeling system 300 may include software, hardware, or both, that configure an arrangement of one or more processors (e.g., among the one or more processors of the machine) to perform the operations described herein for that module. Accordingly, different modules of the machine learning modeling system 300 may include and configure different arrangements of such processors or a single arrangement of such processors at different points in time. Moreover, any two or more modules of the machine learning modeling system 300 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
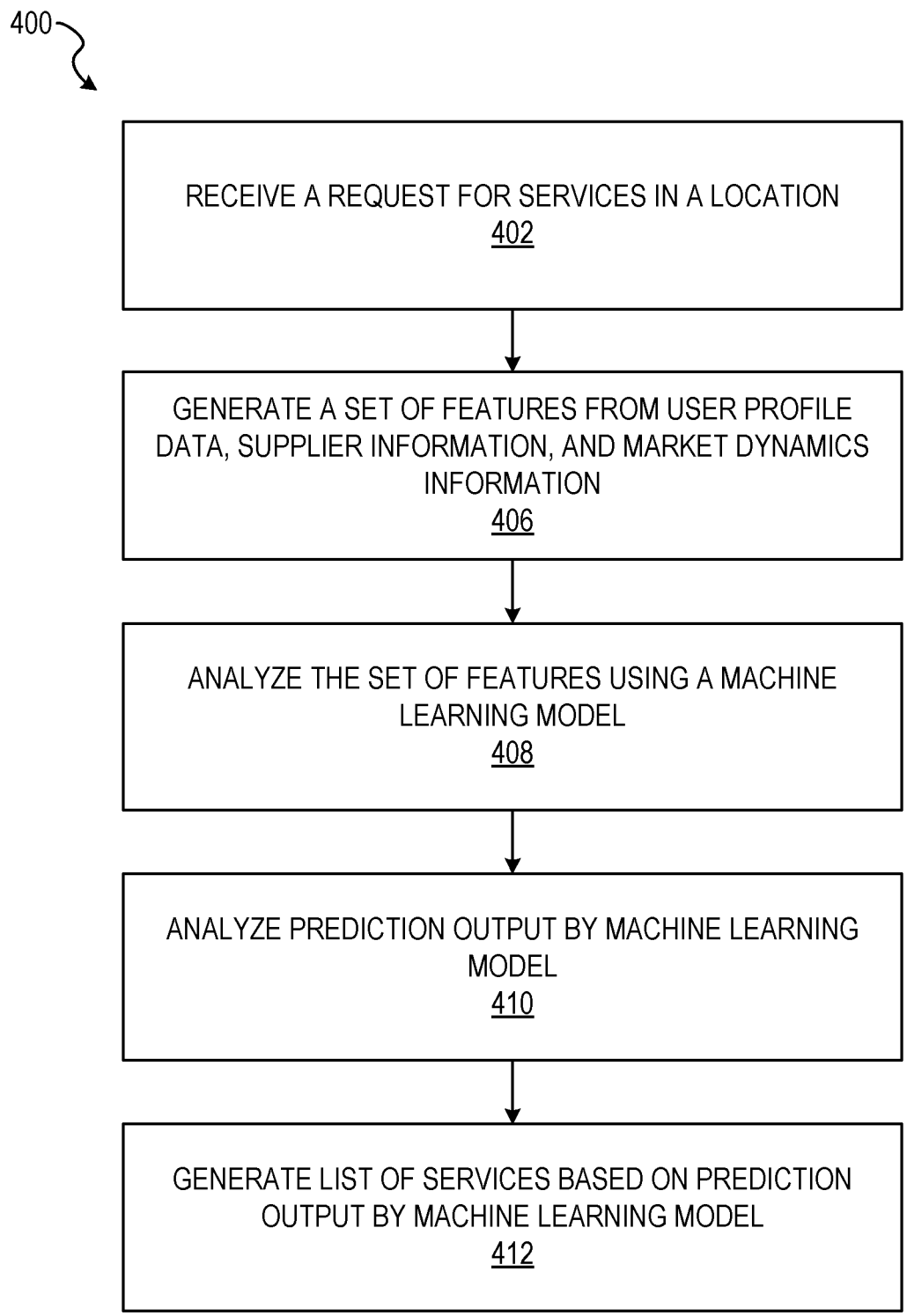
FIG. 4 is a flow chart illustrating aspects of a method for processing a request for services in a given location, according to some example embodiments.

FIG. 4 is a flow chart illustrating aspects of a method 400 for processing a request for services in a given location, according to some example embodiments. For illustrative purposes, the method 400 is described with respect to the networked system 100 of FIG. 1, the reservation system 124 of FIG. 2, and the machine learning modeling system 300 of FIG. 3. It is to be understood that the method 400 may be practiced with other system configurations in other embodiments.

Figure 5:
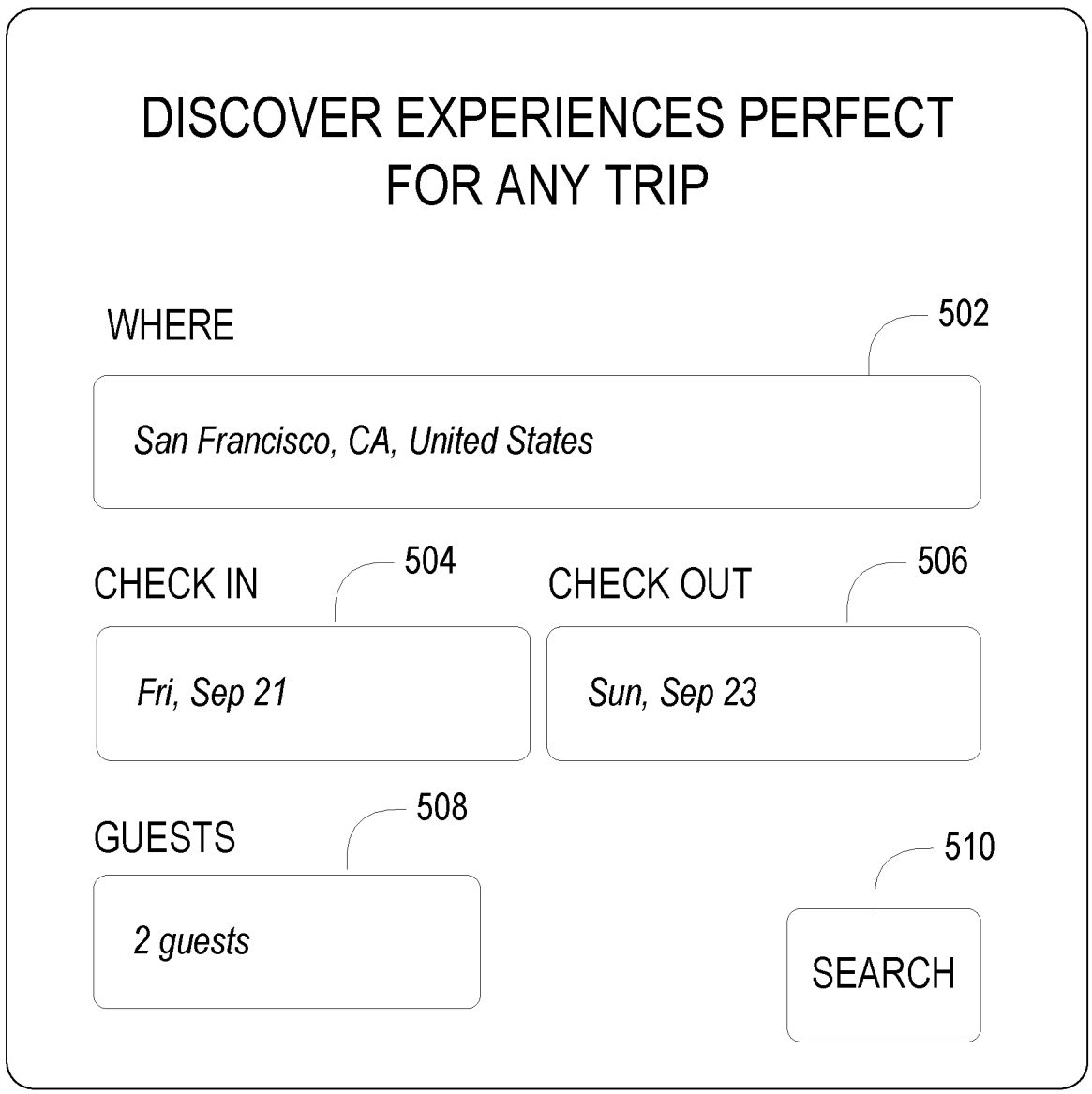
FIG. 5 illustrates an example user interface for entering a request for services, according to some example embodiments.

In operation 402, a computing system (e.g., the server system 102 and/or reservation system 124) receives a request for services in a given location. For example, a user may desire to book (e.g., reserve) a service for an upcoming trip via an online marketplace. FIG. 5 illustrates an example user interface 500 that may be displayed on a client device 110 to allow a user to book a service (e.g., experience). For example, a user may wish to reserve a room or home to stay in for a trip, a tour for the trip, transportation for the trip, and/or the like. The example user interface 500 allows a user to enter a location 502 for the service, one or more dates 504 and 506 for when the user would like to reserve the service, and the number of guests 508 that will be using the service. The user interface 500 further comprises a search 510 element that allows the user to search for listings of services that meet the user's criteria.

The user interface 500 is just one example of information that may be entered to search for relevant services. A user interface may contain less information or inputs (e.g., simply a location input) or more information or inputs (e.g., number of bedrooms, type of accommodation (e.g., entire home or just a room), whether WI-FI is available, etc.). In the example in FIG. 5, once the user selects search 510, the client device 110 sends a request for services that meet the user's criteria to the computing system. For example, the request may comprise location information, one or more dates, a number of guests, and so forth, based on what the user entered in the user interface. The request may also comprise other information such as a timestamp for the request, further user data based on a user profile for the user, a device identifier associated with the client device 110, a price or price range, a type of service (e.g., accommodation, tour, transportation), and so forth.

Returning to FIG. 4, in operation 406, the computing system generates a set of features based on information included in the request for services in the given location, profile data associated with the user interaction with the online marketplace, supplier information for services associated with the given location, and market dynamics information associated with the given location.

Profile data is information that is generated based on user interaction with the online marketplace. For example, data is stored for each interaction that a user has with the online marketplace, such as the criteria (e.g., location, dates, number of guests, type of service, attributes for a service (e.g., number of rooms, type of accommodation, availability of a pool, WI-FI, a full kitchen, or a backyard, etc.)) the user enters or selects for a service, listing items the user selects and/or views, a user booking history (e.g., listing items that a user reserves, listing items that a user cancels), messages sent to and from a host of a service, user preferences, ratings of the user as a guest for services, and so forth. This type of data is comprised by the profile data generated by the computing system for each user of the online marketplace.

Supplier information comprises information about suppliers (e.g., for a given location) generated from supplier (e.g., host, manager, or owner of a service) profiles which may contain data such as identification information (e.g., name, address), listings associated with the supplier, reviews for listings associated with the supplier, calendar and availability information for a listing, and so forth. This type of data is comprised by the supplier profile that is generated by the computing system for each supplier in the online marketplace. The computing system can generate supplier information for services associated with a given location based on suppliers' profiles on the online marketplace. For example, the computing system can search all the suppliers' profiles for listings that are located in (or near) the given location and then pull the relevant information to generate the supplier information.

Market dynamics information is data associated with the market for the given location. For example, this data may include the number of available listings for the given location, the types of services available in the given location, the popularity of the given location, and so forth. The computing system can generate market dynamics information based on the data associated with the market for the given location. The profile data, supplier information, and market dynamics information are stored in one or more databases (e.g., the database(s) 126).

The computing system can generate numerous features based on the profile data, supplier information, and market dynamics information. For example, the computing system can generate (e.g., calculate) the number of available listings for the request (e.g., how many listings are available in the given location) by using the calendar data (for availability) for listings in (or near) the given location. Some other examples of features that the computing system can generate include a number of available listings that are instantly bookable for the given location, how many guests are specified in the request, how many days ahead the request is (e.g., by date of the request) from the date desired (e.g., check-in or reservation date for the service), how many nights are requested for the service, whether the user has used the online marketplace before, and the geographical span radius for the given location.

Another example of a feature includes a host matching score for all the non-instant-book listings in a first result page (e.g., comprising a list of services available in the given location to be displayed in a user interface to a user) before applying any instant-book filter. In one example, a first result page comprises a predetermined number of listings (e.g., 18). In one example, a host matching score is a regression score that is measured based on previous guest booking history and is a 1:1 mapping score between each guest and each listing.

Another example of a feature includes the ratio of instant-book listings among all listings in the first result page before applying any instant-book filter. For example, the computing system may determine the list of available listings that would be displayed in a first result page and then calculate the ratio of the available listings that can be instantly booked to all the available listings. Other examples include the average matching score for all the listings in the first result page before applying any instant-book filter and the average matching score for all listings in the first result page after applying any instant-book filter. In one example, a matching score indicates the possibility that a guest will book the listing and is computed based on a guest's previous booking history.

Yet other example features include the discounted host matching score for all listings in the first result page before applying any instant-book filter and the discounted host matching score for all listings in the first result page after applying any instant-book filter. In one example, a user or guest has a 1:1 mapped matching score for each of the listings in the first result page. For example, a guest Andy has a matching score for the first result page of [10, 8, 12, 9, 7 . . . 15], where 10 is the score of the first listing and the 15 is score for the last listing in the first result page. To discount the matching score, a discount factor (e.g., numbers less than 1) is added and multiplied on each of the listing matching scores based on listing's ranked position in the first result page (e.g., the lower ranked, the smaller discount factor). For example, the value can be 10+0.9*8+0.7*12+ 0.1*15, and so forth, and then added together. Thus, in this way, the top ranked listings have more influence in directing the total matching score value.

Further example features include the maximum number of listing views on any listing in the first result page before applying any instant-book filter, the maximum number of listing views (e.g., how many times the listing has seen by users from creation of the listing) on any listing in the first result page after applying any instant-book filter, the average location distance in the first result page before applying any instant-book filter, the average location distance in the first result page after applying any instant-book filter, the average review rating of the listings in the first result page before applying any instant-book filter, the average review rating of the listings in the first result page after applying any instant-book filter, the average review count (e.g., number of reviews) in the first result page before applying any instant-book filter, the average review count in the first result page after applying any instant-book filter, a flag indicating if the request is for a service starting today or tomorrow, a number of infants listed in the request, a number of children listed in the request, whether the request includes a government identification, whether the guest is highly rated (e.g., has a review rating over a predetermined threshold (e.g., at least 4 out of 5 stars)), a minimum price limit in the request, a maximum price limit in the request, a minimum price range in the request, a maximum price range in the request, whether the requested dates are for a weekend (e.g., weekend stay), whether the request is a bounding-box search, the request (e.g., search) radius value, the day of the week for the request, the hour the request was made, after applying instant book filter how much geographical expansion will be used, the ratio of discounted host matching score values after and before applying any instant-book filter, the number of beds specified in the request, the number of bedrooms specified in the request, and the number of bathrooms specified in the request.

Other example features include the average host matching score for all the listings in the first result page before applying any instant-book filter, the average host matching score for all the listings in the first result page after applying any instant-book filter, how many requests the user has made so far, how many unique listing views the user has viewed, how many listing views the user has viewed, how many inquires (e.g., questions or requests to a host of a listing) the user has made so far, the average daily price the user has paid (e.g., based on transactional history in the online marketplace or another similar system), the average number of guests the user has included in requests so far, the average price of all listings about which the user has inquired, the average capacity of the listings the user has stayed in, the number of guest searches the user has performed in the search session, how many seconds have elapsed since the user sent the last inquiry, how many seconds have elapsed since the guest sent a last request (e.g., search), average cleanliness ratings for the user, how many nights the user has booked on the online marketplace, the number of trips the guest has finished, and how many instant bookings the user has finished. Other features include whether the request was from an Android device, an iPhone device, a desktop web service, or a mobile web/tablet device.

In operation 408, the computing system analyzes the set of features using a machine learning model to predict whether only services that can be instantly booked should be provided in response to the request for services for the given location. As explained earlier in reference to FIG. 3, to train the machine learning model the computing system first generates data to be used for training data. In one example, the training data is generated based on data captured via the online marketplace. Accordingly, the training data comprises data associated with users of the online marketplace (e.g., users booking services, suppliers offering services), market dynamics (e.g., market information and related data), and so forth. In one example, the training data is generated by turning on an instant-book filter all the time for a predetermined percentage (e.g., 5%) of the users of the online marketplace, during which all of the requests (e.g., searches) for services that end in a booking (e.g., reservation) of the service are logged, as explained above. This data is then used as training data to train the machine learning model to predict whether only services that can be instantly booked should be provided in response to a request for services.

The set of features is input into the trained machine learning model to analyze and output a prediction. In one example, the output is 1 or 0, where a 1 indicates that only services that can be instantly booked should be provided in response to the request for services and a 0 indicates that both services that can be instantly booked and services that cannot be instantly booked should be provided in response to the request for services.

In operation 410, the computing system analyzes the prediction output to determine whether only services that can be instantly booked should be provided in response to the request for services or whether both services that can be instantly booked and services that cannot be instantly booked should be provided in response to the request for services. For example, the computing system determines whether the output is a 0 or a 1.

In operation 412 the computing system generates a list of services based on the prediction output by the machine learning model. For example, if the output is a 1, the computing system generates a list of only services that can be instantly booked. If the output is a 0, the computing system generates a list of services that can be instantly booked and services that cannot be instantly booked. The computing system accesses one or more data stores (e.g., listing store 218) to determine which listings match the location and any other criteria requested, and can be instantly booked or not instantly booked, and generate the list of services based on the prediction output by the machine learning model.

The computing system provides the list of services to the requesting client device 110. For example, the computing system provides data for each listing in the list of services to be displayed on the client device 110, a link to each service to be displayed on the client device 110, or other means for providing the data to the client device 110.

Figure 6:
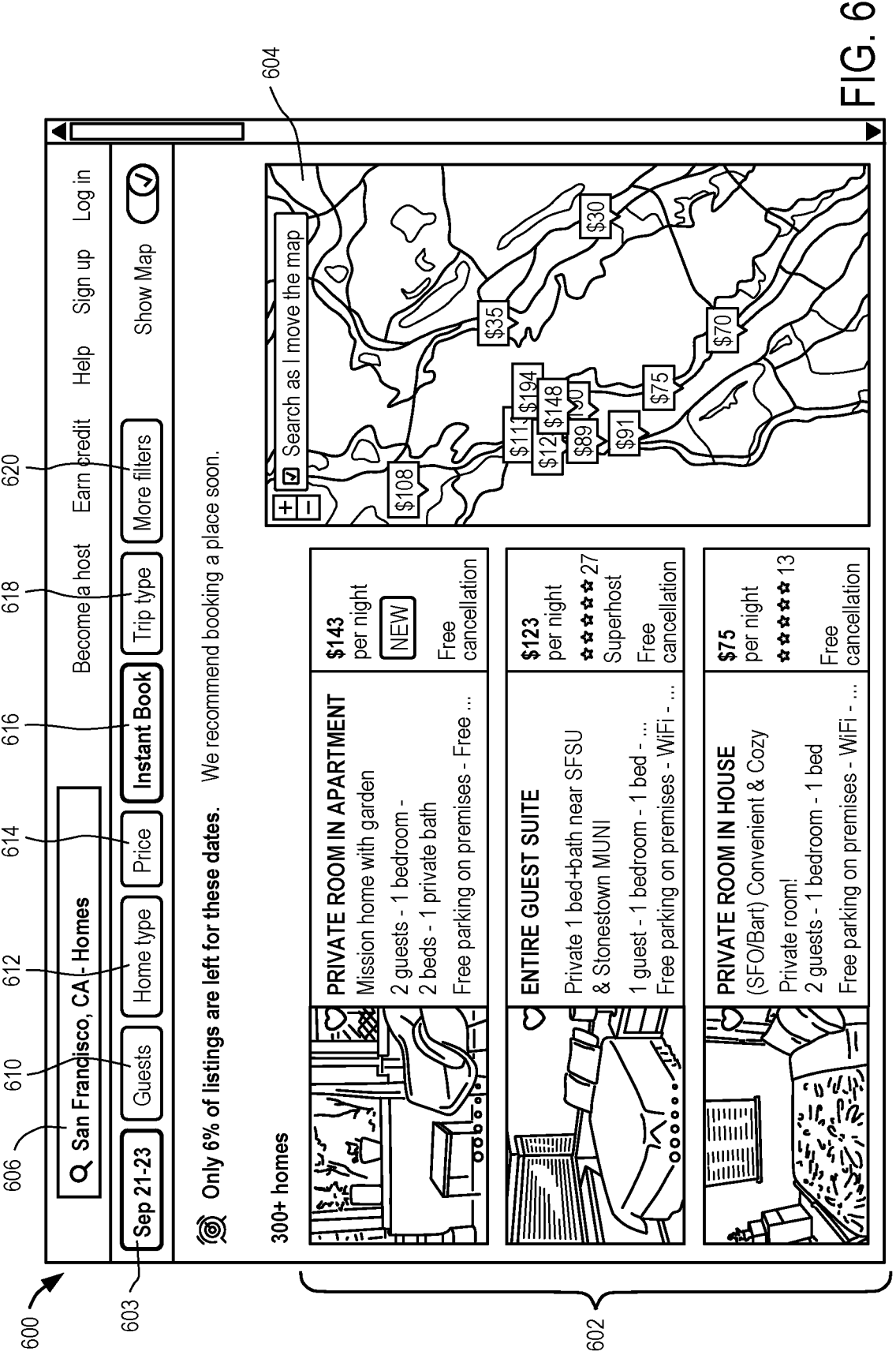
FIG. 6 illustrates an example user interface for displaying a listing of services, according to some example embodiments.

The client device 110 displays the list of services in a user interface displayed on the client device 110. FIG. 6 illustrates an example user interface 600 displaying a first result page listing the services 602 and a map 604 indicating each of the services in a given location 606. The example user interface 600 also provides options for a user to view and update dates for the service 603, indicate the number and type of guests 610, indicate a type of service 612, indicate a price or price range 614, turn on or off instant book 616, and indicate a trip type 618, among other filters 620.

Example embodiments provide a number of advantages. For example, using example embodiments, data insights can be discovered and performance can be optimized in how listings of services are generated in an online marketplace. Moreover, the machine learning model can be continuously improved as the market evolves and changes by re-training the model periodically with more recent data from the online marketplace. Furthermore, time implementation on various platforms is greatly increased since the machine learning model is platform independent.

The following examples describe various embodiments of methods, machine-readable media, and systems (e.g., machines, devices, or other apparatus) discussed herein.

Example 1

A method, comprising:
receiving, by a computing system in an online marketplace, a request for services in a given location from a client device operated by a user;
generating, by the computing system, a set of features based on information included in the request for services in the given location, profile data associated with the user, supplier information for services associated with the given location, and market dynamics information associated with the given location;
analyzing, by the computing system using a machine learning model, the set of features to generate a prediction value indicating whether only services that can be instantly booked should be provided in response to the request for services in the given location;
analyzing, by the computing system, the prediction value output by the machine learning model to determine that only services that can be instantly booked should be provided in response to the request for services in the given location;
generating, by the computing system, a list of a subset of a plurality of services available in the given location comprising only services that can be instantly booked; and
causing, by the computing system, the list with only services that can be instantly booked to be provided to the client device.

Example 2

The method according to Example 1, wherein before analyzing the set of features using the machine learning model, the method comprises:
generating training data to train the machine learning model based on data captured via the online marketplace, the data associated with users of the online marketplace, suppliers of services in the online marketplace, and market dynamics in the online marketplace; and
training the machine learning model using the training data to learn to predict whether only services that can be instantly booked should be listed in response to the request for services in the given location.

Example 3

A method according to any of the previous examples, wherein the request for services in the given location comprises at least one of location information for the given location, a type of service, a date for the service, a price, and a number of guests for the service.

Example 4

A method according to any of the previous examples, wherein generating the set of features comprises calculating at least one of a number of available listings for the request, a number of available listings that are instantly bookable for the given location, how many guests are specified in the request, how many days ahead the request is from a desired date, how many nights are requested for the services, and a geographical span radius for the given location.

Example 5

A method according to any of the previous examples, wherein the set of features comprises at least one of an average location distance in a first result page before applying any instant-book filter, an average location distance in the first result page after applying any instant-book filter, an average review rating of listings in the first result page before applying any instant-book filter, an average review rating of listings in the first result page after applying any instant-book filter, an average review count in the first result page before applying any instant-book filter, an average review count in the first result page after applying any instant-book filter, and a flag indicating if the request is for a service starting today or tomorrow.

Example 6

A method according to any of the previous examples, wherein before generating the set of features, the method comprises:
generating the profile data associated with the user;
generating the supplier information for services associated with the given location based on supplier services listings on the online marketplace; and
storing, in one or more databases, the generated profile data and supplier information.

Example 7

A method according to any of the previous examples, wherein before generating the set of features, the method comprises:
generating the market dynamics information associated with the given location based on market and location data in the online marketplace; and
storing, in one or more databases, the market dynamics information.

Example 8

A method according to any of the previous examples, further comprising:

receiving, by the computing system in the online marketplace, a second request for services in a second given location from a second client device operated by a second user;

generating, by the computing system, a second set of features based on information included in the second request for services in the second given location, profile data associated with the second user, supplier information for services associated with the second given location, and market dynamics information associated with the second given location;

analyzing the second set of features, by the computing system using the machine learning model to predict whether only services that can be instantly booked should be provided in response to the second request for services in the second given location;

analyzing, by the computing system, a second prediction output by the machine learning model to determine that both services that can be instantly booked and services that cannot be instantly booked should be provided in response to the second request for services in the second given location;

generating, by the computing system, a second list with both services that can be instantly booked and services that cannot be instantly booked; and causing, by the computing system, the second list with both services that can be instantly booked and services that cannot be instantly booked to be provided to the second client device.

Example 9

A server computer comprising:
a memory that stores instructions; and
one or more processors configured by the instructions to perform operations comprising:
receiving a request for services in a given location from a client device operated by a user;
generating a set of features based on information included in the request for services in the given location, profile data associated with the user, supplier information for services associated with the given location, and market dynamics information associated with the given location;
analyzing, using a machine learning model, the set of features to generate a prediction value indicating whether only services that can be instantly booked should be provided in response to the request for services in the given location;
analyzing the prediction value output by the machine learning model to determine that only services that can be instantly booked should be provided in response to the request for services in the given location;
generating a list of a subset of a plurality of services available in the given location comprising only services that can be instantly booked; and
causing the list with only services that can be instantly booked to be provided to the client device.

Example 10

A server according to any of the previous examples, wherein before analyzing the set of features using the machine learning model, the operations comprise:
generating training data to train the machine learning model based on data captured via the online marketplace, the data associated with users of the online marketplace, suppliers of services in the online marketplace, and market dynamics in the online marketplace; and
training the machine learning model using the training data to learn to predict whether only services that can be instantly booked should be listed in response to the request for services in the given location.

Example 11

A server according to any of the previous examples, wherein the request for services in the given location comprises at least one of location information for the given location, a type of service, a date for the service, a price, and a number of guests for the service.

Example 12

A server according to any of the previous examples, wherein generating the set of features comprises calculating at least one of a number of available listings for the request, a number of available listings that are instantly bookable for the given location, how many guests are specified in the request, how many days ahead the request is from a desired date, how many nights are requested for the services, and a geographical span radius for the given location.

Example 13

A server according to any of the previous examples, wherein the set of features comprises at least one of an average location distance in a first result page before applying any instant-book filter, an average location distance in the first result page after applying any instant-book filter, an average review rating of listings in the first result page before applying any instant-book filter, an average review rating of listings in the first result page after applying any instant-book filter, an average review count in the first result page before applying any instant-book filter, an average review count in the first result page after applying any instant-book filter, and a flag indicating if the request is for a service starting today or tomorrow.

Example 14

A server according to any of the previous examples, wherein before generating the set of features, the operations comprise:
generating profile data associated the user;
generating the supplier information for services associated with the given location based on supplier services listings on the online marketplace; and
storing, in one or more databases, the generated profile data and supplier information.

Example 15

A server according to any of the previous examples, wherein before generating the set of features, the operations comprise:
generating the market dynamics information associated with the given location based on market and location data in the online marketplace; and
storing, in one or more databases, the market dynamics information.

Example 16

A server according to any of the previous examples, the operations further comprising:

receiving a second request for services in a second given location from a second client device operated by a second user;

generating a second set of features based on information included in the second request for services in the second given location, profile data associated with the second user, supplier information for services associated with the second given location, and market dynamics information associated with the second given location;

analyzing the second set of features using the machine learning model to predict whether only services that can be instantly booked should be provided in response to the second request for services in the second given location;

analyzing a second prediction output by the machine learning model to determine that both services that can be instantly booked and services that cannot be instantly booked should be provided in response to the second request for services in the second given location;

generating a second list with both services that can be instantly booked and services that cannot be instantly booked; and causing the second list with both services that can be instantly booked and services that cannot be instantly booked to be provided to the second client device.

Example 17

A non-transitory computer-readable medium comprising instructions stored thereon that are executable by at least one processor to cause a computing device associated with a first data owner to perform operations comprising:

receiving a request for services in a given location from a client device operated by a user;

generating a set of features based on information included in the request for services in the given location, profile data associated with the user, supplier information for services associated with the given location, and market dynamics information associated with the given location;

analyzing, using a machine learning model, the set of features to generate a prediction value indicating whether only services that can be instantly booked should be provided in response to the request for services in the given location;

analyzing the prediction value output by the machine learning model to determine that only services that can be instantly booked should be provided in response to the request for services in the given location;

generating a list of a subset of a plurality of services available in the given location comprising only services that can be instantly booked; and causing the list with only services that can be instantly booked to be provided to the client device.

Example 18

A non-transitory computer-readable medium according to any of the previous examples, wherein the request for services in the given location comprises at least one of location information for the given location, a type of service, a date for the service, a price, and a number of guests for the service.

Example 19

A non-transitory computer-readable medium according to any of the previous examples, wherein generating the set of features comprises calculating at least one of a number of available listings for the request, a number of available listings that are instantly bookable for the given location, how many guests are specified in the request, how many days ahead the request is from a desired date, how many nights are requested for the service, and a geographical span radius for the given location.

Example 20

A non-transitory computer-readable medium according to any of the previous examples, wherein the set of features comprises at least one of an average location distance in a first result page before applying any instant-book filter, an average location distance in the first result page after applying any instant-book filter, an average review rating of listings in the first result page before applying any instant-book filter, an average review rating of listings in the first result page after applying any instant-book filter, an average review count in the first result page before applying any instant-book filter, an average review count in the first result page after applying any instant-book filter, and a flag indicating if the request is for a service starting today or tomorrow.

Figure 7:
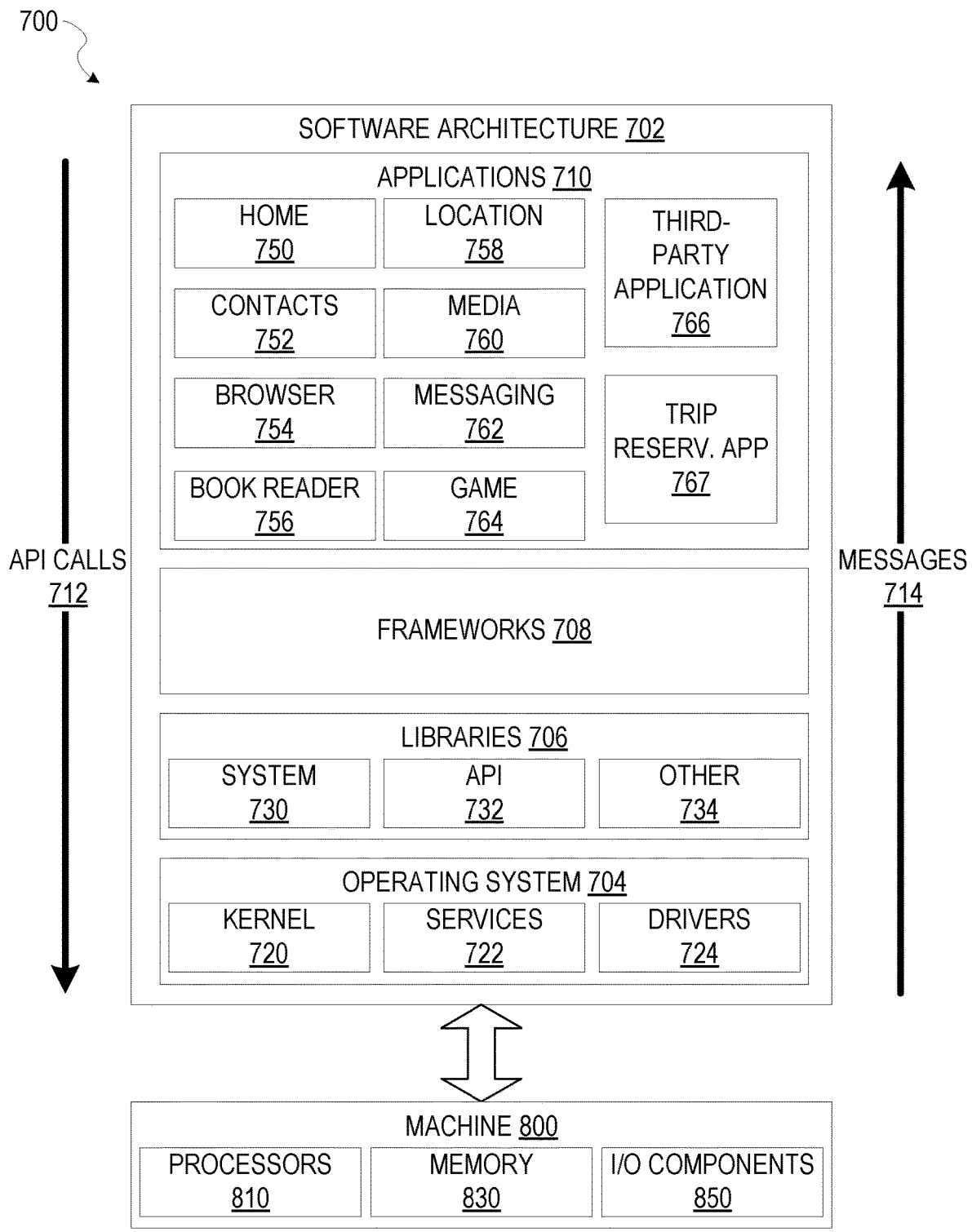
FIG. 7 is a block diagram illustrating an example of a software architecture that may be installed on a machine, according to some example embodiments.

FIG. 7 is a block diagram 700 illustrating a software architecture 702, which can be installed on any one or more of the devices described above. For example, in various embodiments, the client device 110 and server systems 130, 102, 120, 122, and 124 may be implemented using some or all of the elements of the software architecture 702. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Some embodiments may particularly include a trip reservation application 767, which may be any application that requests data or other tasks to be performed by systems and servers described herein, such as the server system 102, third-party servers 130, and so forth. In certain embodiments, this may be a standalone application that operates to manage communications with a server system such as the third-party servers 130 or server system 102. In other embodiments, this functionality may be integrated with another application. The trip reservation application 767 may request and display various data related to an online marketplace and may provide the capability for a user 106 to input data related to the system via voice, a touch interface, or a keyboard, or using a camera device of the machine 800, communication with a server system via the I/O components 850, and receipt and storage of object data in the memory 830. Presentation of information and user inputs associated with the information may be managed by the trip reservation application 767 using different frameworks 708, library 706 elements, or operating system 704 elements operating on a machine 800.

Figure 8:
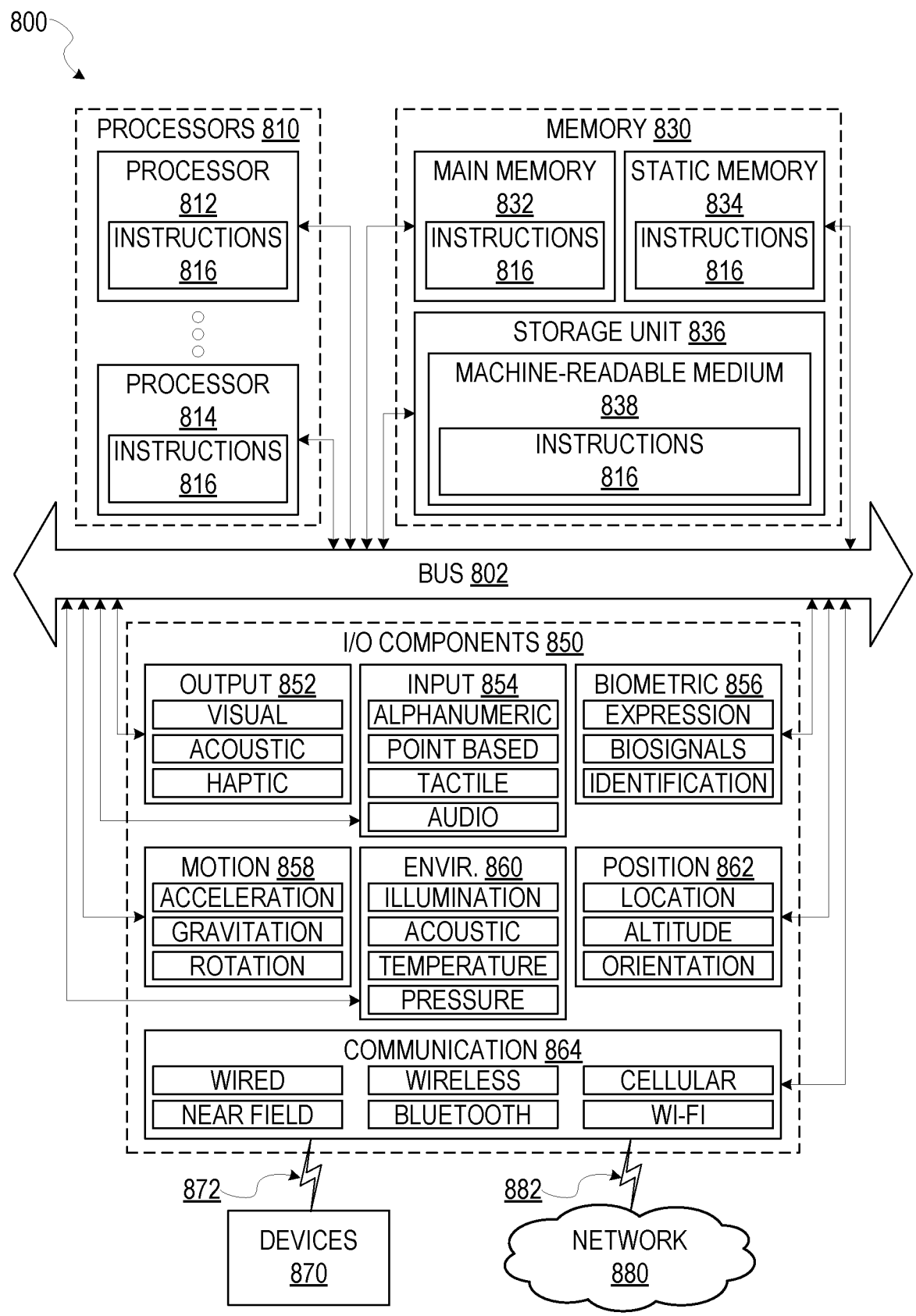
FIG. 8 illustrates a diagrammatic representation of a machine in the form of a computer system, within which a set of instructions may be executed for causing the machine to perform any one or more of the methodologies discussed herein, according to an example embodiment.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine 130, 102, 120, 122, 124, and the like, or a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   generating, by a computing system in an online marketplace, training data to train a machine learning model based on data captured via the online marketplace, the data associated with users of the online marketplace, suppliers of services in the online marketplace, and market dynamics in the online marketplace;
   training, by the computing system in the online marketplace, the machine learning model using the training data to predict whether only services that can be instantly booked should be listed in response to a request for services in a given location or that both services that can be instantly booked and services that cannot be instantly booked should be provided in response to a request for services in a given location;
   analyzing, by the computing system using the machine learning model, a set of features based on a request for service in a given location to generate a prediction value indicating whether only services that can be instantly booked should be provided in response to the request for services in the given location or that both services that can be instantly booked and services that cannot be instantly booked should be provided in response to the request for services in the given location;
   based on determining that the prediction value output by the machine learning model indicates that only services that can be instantly booked should be provided in response to the request for services in the given location, performing operations comprising:
- generating, by the computing system, a list of a subset of a plurality of services available in the given location comprising only services that can be instantly booked; and
- causing, by the computing system, the list with only services that can be instantly booked to be provided to a client device in response to the request for services in the given location; and based on determining that the prediction value output by the machine learning model indicates that both services that can be instantly booked and services that cannot be instantly booked should be provided in response to the request for services in the given location, performing operations comprising:
- generating, by the computing system, a list of services that can be instantly booked and services that cannot be instantly booked; and
- causing, by the computing system, the list of services that can be instantly booked and services that cannot be instantly booked to be provided to the client device in response to the request for services in the given location.

2. The method of claim 1, wherein the request for services in the given location comprises at least one of location information for the given location, a type of service, a date for the service, a price, and a number of guests for the service.

3. The method of claim 1, wherein the set of features are generated by calculating at least one of a number of available listings for the request, a number of available listings that are instantly bookable for the given location, how many guests are specified in the request, how many days ahead the request is from a desired date, how many nights are requested for the services, and a geographical span radius for the given location.

4. The method of claim 1, wherein the set of features comprises at least one of an average location distance in a first result page before applying any instant-book filter, an average location distance in the first result page after applying any instant-book filter, an average review rating of listings in the first result page before applying any instant-book filter, an average review rating of listings in the first result page after applying any instant-book filter, an average review count in the first result page before applying any instant-book filter, an average review count in the first result page after applying any instant-book filter, and a flag indicating if the request is for a service starting today or tomorrow.

5. The method of claim 1, further comprising:
- generating profile data associated with a user making the request for service in the given location;
- generating supplier information for services associated with the given location based on supplier services listings on the online marketplace; and
- storing, in one or more databases, the generated profile data and supplier information.

6. The method of claim 1, further comprising:
- generating market dynamics information associated with the given location based on market and location data in the online marketplace; and
- storing, in one or more databases, the market dynamics information.

7. The method of claim 1, wherein services that can be instantly booked comprise services that are booked upon receipt of a request to book the services.

8. The method of claim 1, wherein the model training data is generated at least by collecting data while an instant booking feature is turned on for a specified percentage of users of the online marketplace.

9. The method of claim 8, wherein collecting data comprises logging all requests for services that end in a booking of the service.

10. The method of claim 1, wherein the prediction value is a numerical value that has a first value to indicate that only services that can be instantly booked should be provided in response to the request for service in the given location or a second value to indicate that both services that can be instantly booked and services that cannot be instantly booked should be provided in response to the request for services in the given location.

11. A server computer in an online marketplace comprising:
- a memory that stores instructions; and
- one or more processors configured by the instructions to perform operations comprising:
  - generating training data to train a machine learning model based on data captured via the online marketplace, the data associated with users of the online marketplace, suppliers of services in the online marketplace, and market dynamics in the online marketplace;
  - training the machine learning model using the training data to predict whether only services that can be instantly booked should be listed in response to a request for services in a given location or that both services that can be instantly booked and services that cannot be instantly booked should be provided in response to a request for services in a given location;
  - analyzing, using the machine learning model, a set of features based on a request for service in a given location to generate a prediction value indicating whether only services that can be instantly booked should be provided in response to the request for services in the given location or that both services that can be instantly booked and services that cannot be instantly booked should be provided in response to the request for services in the given location;
  - based on determining that the prediction value output by the machine learning model indicates that only services that can be instantly booked should be provided in response to the request for services in the given location, performing operations comprising:
    - generating a list of a subset of a plurality of services available in the given location comprising only services that can be instantly booked; and
    - causing the list with only services that can be instantly booked to be provided to a client device in response to the request for services in the given location; and
  - based on determining that the prediction value output by the machine learning model indicates that both services that can be instantly booked and services that cannot be instantly booked should be provided in response to the request for services in the given location, performing operations comprising:
    - generating a list of services that can be instantly booked and services that cannot be instantly booked; and
    - causing the list of services that can be instantly booked and services that cannot be instantly booked to be provided to the client device in response to the request for services in the given location.

12. The server computer of claim 11, wherein the request for services in the given location comprises at least one of location information for the given location, a type of service, a date for the service, a price, and a number of guests for the service.

13. The server computer of claim 11, wherein the set of features are generated by calculating at least one of a number of available listings for the request, a number of available listings that are instantly bookable for the given location, how many guests are specified in the request, how many days ahead the request is from a desired date, how many nights are requested for the services, and a geographical span radius for the given location.

14. The server computer of claim 11, wherein the set of features comprises at least one of an average location distance in a first result page before applying any instant-book filter, an average location distance in the first result page after applying any instant-book filter, an average review rating of listings in the first result page before applying any instant-book filter, an average review rating of listings in the first result page after applying any instant-book filter, an average review count in the first result page before applying any instant-book filter, an average review count in the first result page after applying any instant-book filter, and a flag indicating if the request is for a service starting today or tomorrow.

15. The server computer of claim 11, the operations further comprising:
generating profile data associated with a user making the request for service in the given location;
generating supplier information for services associated with the given location based on supplier services listings on the online marketplace; and
storing, in one or more databases, the generated profile data and supplier information.

16. The server computer of claim 11, the operations further comprising:
generating market dynamics information associated with the given location based on market and location data in the online marketplace; and
storing, in one or more databases, the market dynamics information.

17. The server computer of claim 11, wherein services that can be instantly booked comprise services that are booked upon receipt of a request to book the services.

18. The server computer of claim 11, wherein the model training data is generated at least by collecting data while an instant booking feature is turned on for a specified percentage of users of the online marketplace.

19. The server computer of claim 11, wherein collecting data comprises logging all requests for services that end in a booking of the service.

20. A non-transitory computer-readable medium comprising instructions stored thereon that are executable by at least one processor to cause a computing device associated with a first data owner to perform operations comprising:
generating training data to train a machine learning model based on data captured via the online marketplace, the data associated with users of the online marketplace, suppliers of services in the online marketplace, and market dynamics in the online marketplace;
training the machine learning model using the training data to predict whether only services that can be instantly booked should be listed in response to a request for services in a given location or that both services that can be instantly booked and services that cannot be instantly booked should be provided in response to a request for services in a given location;
analyzing, using the machine learning model, a set of features based on a request for service in a given location to generate a prediction value indicating whether only services that can be instantly booked should be provided in response to the request for services in the given location or that both services that can be instantly booked and services that cannot be instantly booked should be provided in response to the request for services in the given location;
based on determining that the prediction value output by the machine learning model indicates that only services that can be instantly booked should be provided in response to the request for services in the given location, performing operations comprising:
generating a list of a subset of a plurality of services available in the given location comprising only services that can be instantly booked; and
causing the list with only services that can be instantly booked to be provided to a client device in response to the request for services in the given location; and
based on determining that the prediction value output by the machine learning model indicates that both services that can be instantly booked and services that cannot be instantly booked should be provided in response to the request for services in the given location, performing operations comprising:
generating a list of services that can be instantly booked and services that cannot be instantly booked; and
causing the list of services that can be instantly booked and services that cannot be instantly booked to be provided to the client device in response to the request for services in the given location.

* * * * *